United States Patent
Hendricks et al.

(10) Patent No.: US 8,473,781 B1
(45) Date of Patent: Jun. 25, 2013

(54) COMPUTING DEVICE WITH RECOVERY MODE

(75) Inventors: David Hendricks, Campbell, CA (US); Ryan Tabone, San Francisco, CA (US); Linus Upson, Woodside, CA (US); Randall Spangler, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/448,892

(22) Filed: Apr. 17, 2012

Related U.S. Application Data

(63) Continuation of application No. 12/904,152, filed on Oct. 13, 2010.

(60) Provisional application No. 61/251,293, filed on Oct. 13, 2009.

(51) Int. Cl.
*G06F 11/00* (2006.01)
(52) U.S. Cl.
USPC .............................................. 714/15
(58) Field of Classification Search
USPC .............................................. 714/15
See application file for complete search history.

(56) References Cited

U.S. PATENT DOCUMENTS

| | | | |
|---|---|---|---|
| 6,278,791 B1 | 8/2001 | Honsinger et al. | |
| 7,117,302 B2 | 10/2006 | Lundeby et al. | |
| 8,271,833 B2 | 9/2012 | Stakutis et al. | |
| 2003/0221095 A1 | 11/2003 | Gaunt et al. | |
| 2004/0172578 A1 | 9/2004 | Chen et al. | |
| 2005/0193182 A1* | 9/2005 | Anderson et al. | 711/163 |
| 2006/0112313 A1* | 5/2006 | Tripp et al. | 714/36 |
| 2006/0179308 A1 | 8/2006 | Morgan et al. | |
| 2007/0180509 A1* | 8/2007 | Swartz et al. | 726/9 |
| 2008/0168244 A1 | 7/2008 | Chu Chen et al. | |
| 2008/0168275 A1 | 7/2008 | De Atley et al. | |
| 2008/0244257 A1* | 10/2008 | Vaid et al. | 713/2 |
| 2009/0150598 A1 | 6/2009 | Jung et al. | |
| 2009/0259854 A1* | 10/2009 | Cox et al. | 713/189 |
| 2010/0037092 A1* | 2/2010 | Zamora | 714/6 |
| 2010/0146231 A1* | 6/2010 | Gopalan et al. | 711/162 |
| 2011/0087920 A1 | 4/2011 | Hendricks et al. | |

OTHER PUBLICATIONS

U.S. Appl. No. 12/904,152, filed Oct. 13, 2010, Pending.
"Firmware Boot and Recovery", The Chromium Projects, Nov. 19, 2009, 14 pages.
Non-Final Office Action for U.S. Appl. No. 12/904,152, mailed Nov. 7, 2012, 19 pages.
Non-Final Office Action Response for U.S. Appl. No. 12/904,152, filed Feb. 6, 2013, 15 pages.
U.S. Appl. No. 12/904,152, fiiled Oct. 13, 2010, Pending.

* cited by examiner

*Primary Examiner* — Bryce Bonzo
(74) *Attorney, Agent, or Firm* — Brake Hughes Bellermann LLP

(57) ABSTRACT

Methods and apparatus for implementing a recovery mode procedure for a computing device are disclosed. In an example method, a computing device is configured to receive a first indication, the first indication indicating that instructions for implementing a recovery mode are to be executed. The instructions to implement the recovery mode are executed in response to receiving the first indication. Implementing the recovery mode includes receiving a second indication and, based on the second indication, performing one of a first process that includes replacing current operating system software of the computing device and removing user data from the computing device with a trusted version of operating system software of the computing device or a second process that includes replacing current operating system software of the computing device with the trusted version of operating system software of the computing device and retaining user data on the computing device.

29 Claims, 10 Drawing Sheets

COMPUTING DEVICE WITH RECOVERY MODE

CROSS REFERENCE TO RELATED APPLICATIONS

This application claims the benefit, under 35 U.S.C. §120, as a continuation application of U.S. patent application Ser. No. 12/904,152, filed on Oct. 13, 2010, also entitled "Computing Device with Recovery Mode." U.S. patent application Ser. No. 12/904,152, in turn, claims the benefit under 35 U.S.C. §119(e) of U.S. Provisional Patent Application Ser. No. 61/251,293, filed on Oct. 13, 2009. The disclosures of U.S. patent application Ser. No. 12/904,152 and U.S. Provisional Application Ser. No. 61/251,293 are incorporated by reference herein in their entirety.

TECHNICAL FIELD

This description relates, in general, to computing devices.

BACKGROUND

The market for computing devices, such as personal computers, laptop computers and netbook computers, for example, has continued to grow. Such computing devices generally operate using a combination of firmware and software that is configured to execute on the hardware of a given computing device. A given set of firmware and software that is used to operate a computing device may be referred to as an image, or an operating image for the computing device. Various situations may occur where it is desired to replace or repair a current image of a computing device.

For instance, a computing device's image may become corrupted. Such corruption may be the result of a malicious act. Such malicious acts include modification of a computing device's image to install malicious software or "malware" (e.g., viruses, spyware, password sniffers, etc.). Corruption of an image may also occur as a result of other causes. For example, a computing device's image could become corrupted as a result of an update to the image (e.g., to improve functionality or to enhance security of the computing device) being interrupted due to loss of network connectivity, a power failure, or a number of other factors. In these instances, it is desirable that the corrupted image be replaced or repaired with an image that is free of corruption, such as malware.

In other situations, a user may load an alternative image onto a computing device and then, at a later point, wish to restore the computing device to its original image, or to install another alternative image on the computing. In these situations, it is desirable to replace the alternative image with an image that is free of corruption, such as malware, for example.

SUMMARY

In a first general aspect, an example computing device includes a processor and at least one memory device operationally coupled with the processor. In the example computing device, the at least one memory device has instructions stored thereon that, when executed by the processor, cause the computing device to determine that a recovery mode procedure is to be executed on the computing device. The instructions, when executed by the processor, further cause the example computing device to determine whether a trusted recovery image is accessible to the computing device. In the event the trusted recovery image is accessible to the computing device, the instructions, when executed, further cause the example computing device to execute the recovery mode procedure to repair or replace a current image of the computing device using the trusted recovery image. In the event the trusted recovery image is not accessible to the computing device, the instructions, when executed, further cause the example computing device to provide instructions for obtaining the trusted recovery image, determine the obtained trusted recovery image is accessible to the computing device and execute the recovery mode procedure to repair or replace the current image of the computing device using the obtained trusted recovery image.

In a second general aspect, an example computer-implemented method includes determining, by a computing device, that a recovery mode procedure is to be executed on the computing device. The example computer-implemented method further includes determining whether a trusted recovery image is accessible to the computing device. In the event the trusted recovery image is accessible to the computing device, the example computer-implemented method includes executing the recovery mode procedure to repair or replace a current image of the computing device using the trusted recovery image. In the event the trusted recovery image is not accessible to the computing device, the example computer-implemented method includes providing instructions for obtaining the trusted recovery image, determining the obtained trusted recovery image is accessible to the computing device and executing the recovery mode procedure to repair or replace the current image of the computing device using the obtained trusted recovery image.

In a third general aspect, an example recordable storage medium has instructions recorded and stored thereon. The instructions of the example storage medium, when executed by a computing device, cause the computing device to determine that a recovery mode procedure is to be executed on the computing device. The instructions of the example storage medium, when executed, further cause the computing device to determine whether a trusted recovery image is accessible to the computing device. In the event the trusted recovery image is accessible to the computing device, the instructions, when executed, still further cause the computing device to execute the recovery mode procedure to repair or replace a current image of the computing device using the trusted recovery image. In the event the trusted recovery image is not accessible to the computing device, the instructions, when executed, also further cause the computing device to provide instructions for obtaining the trusted recovery image, determine the obtained trusted recovery image is accessible to the computing device and execute the recovery mode procedure to repair or replace the current image of the computing device using the obtained trusted recovery image.

BRIEF DESCRIPTION OF THE DRAWINGS

Like reference symbols in the various drawings indicate like elements.

DETAILED DESCRIPTION

Figure 1:
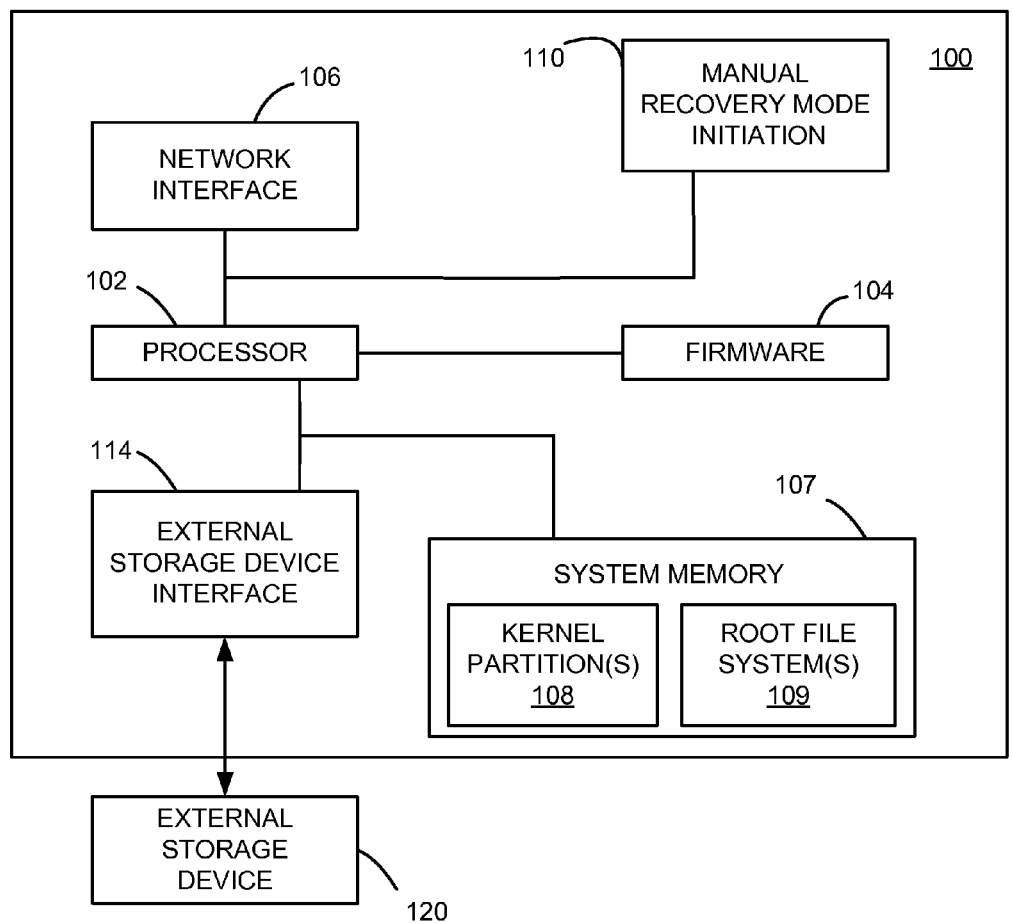
FIG. 1 is a block diagram illustrating a computing device in accordance with an example embodiment.
Figure 8B:
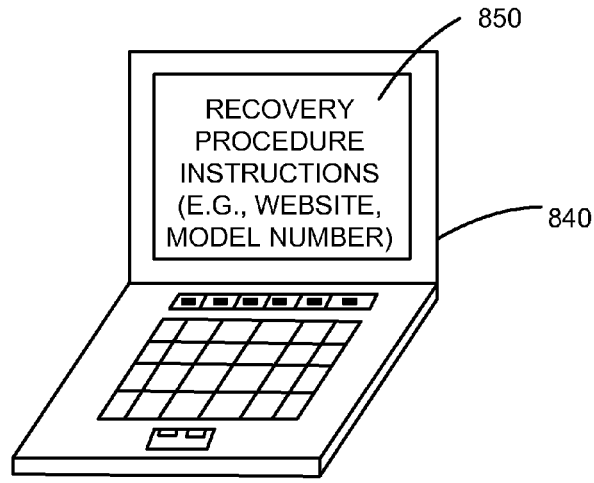
FIG. 8B is a diagram illustrating a computing device in accordance with an example embodiment.
Figure 9A:
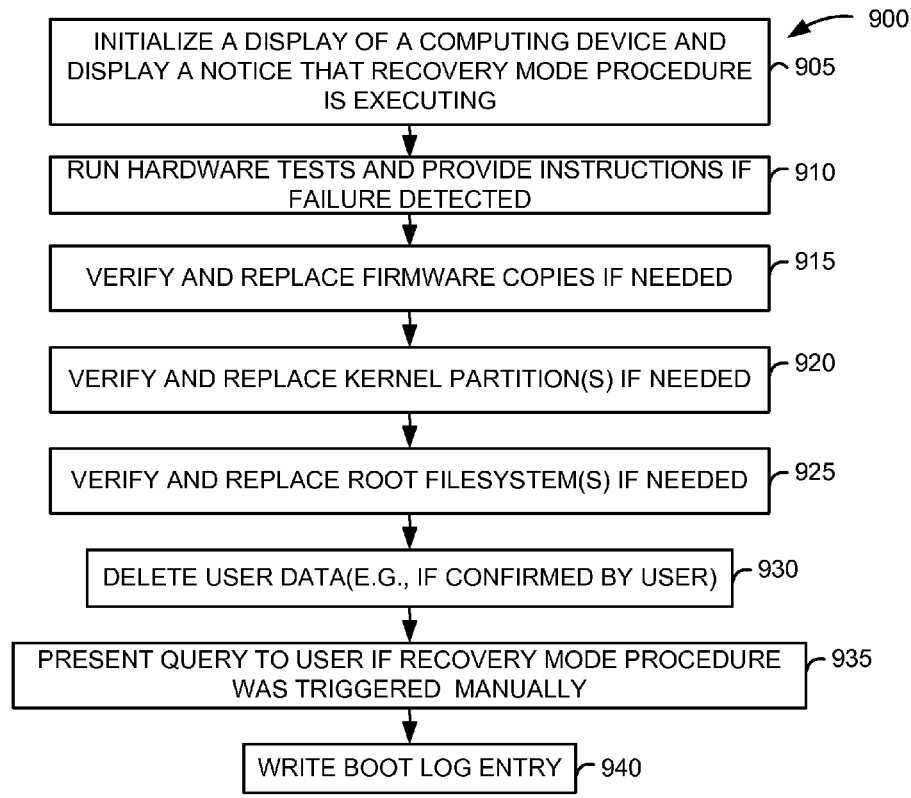
FIG. 9A is a flowchart illustrating operations of a recovery mode procedure in accordance with an example embodiment.
Figure 9B:
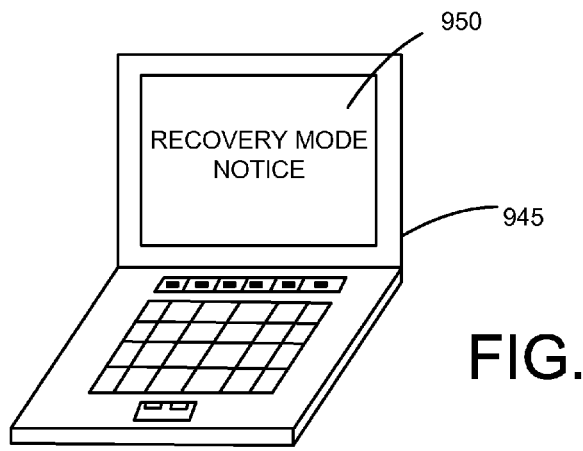
FIG. 9B is a diagram illustrating a computing device in accordance with an example embodiment.

FIG. 1 is a block diagram illustrating a computing device 100 in accordance with an example embodiment. While the computing device 100 is shown in one particular configuration, it will be understood that the computing device 100 may include additional, alternative, or fewer elements. As some examples, the computing device 100 may include a display (such as shown in FIGS. 8B and 9B), or a number of other devices or elements. Also, the elements of the computing device 100 may be combined and/or integrated with one another in a number of appropriate combinations.

As shown in FIG. 1, the computing device 100 includes a processor 102. The processor 102 may be used to control the various elements of the computing device 100 by, for example, executing machine-readable instructions that are stored in firmware 104, in system memory 107 and/or in an external storage device 120. The system memory 107 may include cache memory, random access memory, one or more hard drives (e.g., a flash memory drive, a magnetic drive or an optical drive), as well as other types of data memory devices. The processor 102 may also execute machine-readable instructions that are obtained from other sources, such as via a network interface 106, for example. Depending on the particular embodiment, the network interface 106 may be a wired network interface and/or a wireless network interface.

The firmware 104 may include instructions that are executed by the processor 102 when booting the computing device 100. The instructions stored in the firmware 104 may then direct the processor 102 to execute and/or load instructions that are stored in the system memory 107. In other instances, such as when implementing a recovery mode procedure, the instructions in the firmware 104 may instruct the processor 102 to execute and/or load instructions that are stored on the external (removable) data storage device 120, which may be operably coupled with the computing device 100 via an external storage device interface 114. For example, the removable data storage device 120 may be a universal serial bus (USB) drive or a secure digital (SD) card, and the interface 114 may be, respectively, a USB data port or a SD card reader. In other embodiments, the external storage device 120 and the interface 114 may take other forms.

As shown in FIG. 1, the system memory 107 of the computing device 100 may include one or more instances of a kernel partition 108 for the computing device and one or more instances of a root filesystem 109 for the computing device. In a computing device that includes multiple instances of a kernel partition and/or a root filesystem, those multiple instances may act as redundant copies. In such an arrangement, if the computing system 100 detects corruption (e.g., using instructions stored in the firmware 104) in one of the instances of the kernel partitions 107 or the root filesystems 109, a redundant instance may be used (if it is free of corruption) to boot and/or operate the computing device 100. In one embodiment, each instance of the root filesystem 109 in the computing device 100 may include an instance of an operating system for the computing device 100, which may treated as redundant in the same fashion as the kernel partitions 108 and the other portions of the root filesystems 109.

While such operations and procedures are discussed in further detail below, briefly, as one example, the computing device 100 may execute a recovery mode procedure, which may include copying machine-readable instructions from the external storage device 120 and executing and/or storing the copied instructions in the firmware 104 and/or the system memory 107. In another example, the computing device 100 may execute a recovery mode procedure, which may include restoring operating software (e.g., boot operations and/or an operating system) of the computing device 100 (e.g., in the firmware 104 and/or the system memory 107) to a known and trusted state. Such a recovery mode procedure may include copying machine-readable instructions that are digitally signed by a trusted supplier from the external storage device 120 and storing the signed instructions in the firmware 104 and/or the system memory 107 using, for example, the approaches described herein.

The computing device 100 further includes a manual recovery mode initiation device 110. The manual recovery mode device 110 may be an input device, such as a button, that a user may engage in order to direct the computing device 100 to execute a recovery mode procedure. Alternatively, the computing device 100 may initiate execution of a recovery mode procedure in response to detecting that one or more portions of a current image of the computing device 100 is/are not in an expected state (e.g., corrupt and/or missing). The computing device 100 may determine whether one or more portions of its current image are corrupt using, for example, respective digital signatures that correspond with each of those portions and a public encryption key for verifying that signature. Other techniques for detecting corruption may also be employed. For instance, corruption of the computing system 100's current image may be detected using parity checks, error correction codes, or a number of other appropriate techniques.

Depending on the particular embodiment and/or situation, the recovery mode procedure may be initiated immediately after engagement of the recovery mode device 110 or detection of an unexpected state (e.g., corruption) in the computing device 100's current image. Alternatively, the recovery mode procedure may be initiated during a next boot cycle of the computing device 100, such as in response to a value stored by an operating system of the computing device or in response to engaging the manual recovery mode device 110, where the stored value indicates that the recovery mode procedure should be executed. The stored value may also indicate the reason for requesting execution of the recovery mode procedure.

With respect to initiating the recovery mode procedure at a next boot cycle of the computing device 100, engagement of the manual recovery mode device 110 or detection of an unexpected state in the computing device 100's current image may be recorded in the system memory 107, the firmware 104 or in any other appropriate manner, such as by setting a recovery mode flag or value in a system register. The computing device 100 may check the recovery mode flag during its boot sequence and initiate execution of the recovery mode procedure when the recovery mode flag/values is set to indicate that the procedure should be run. In such arrangements, the recovery mode flag/value may be cleared when the recovery mode procedure is initiated, so as to prevent the computing device 100 from executing the recovery mode procedure on every subsequent boot cycle. In certain embodiments, as indicated above, the recovery mode flag/value may also provide an indication as the reason for running the recovery mode procedure (e.g., the manual recovery mode device 110 was engaged and/or an unexpected state was detected).

Figure 2A:
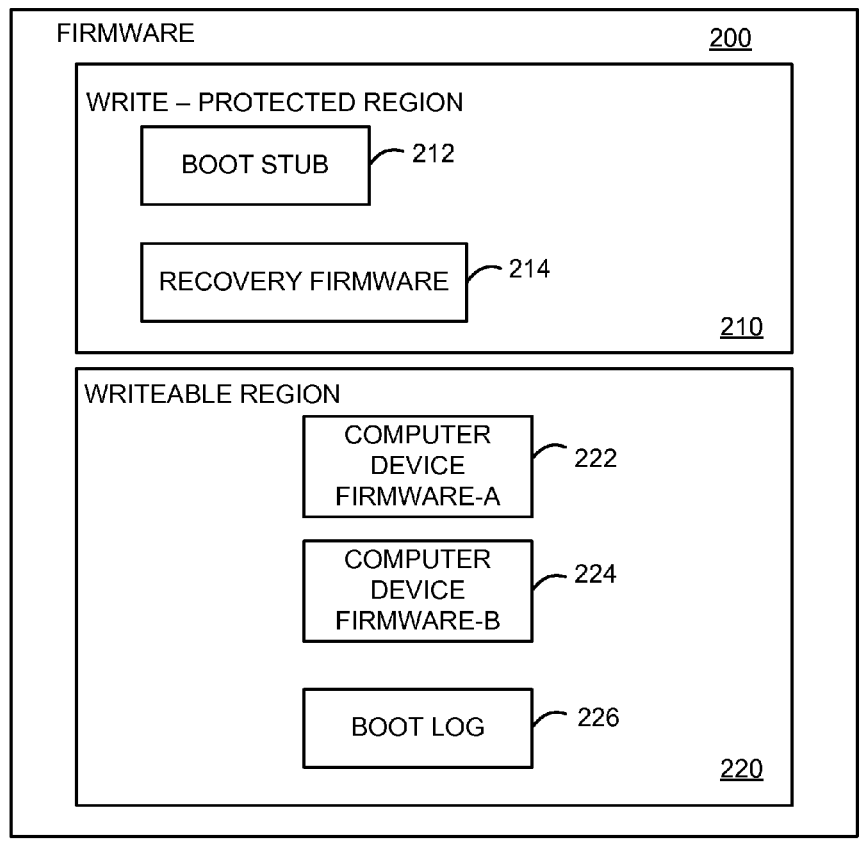
FIGS. 2A and 2B are block diagrams illustrating firmware in accordance with an example embodiment.

FIG. 2A is a block diagram illustrating firmware 200 in accordance with an example embodiment. The firmware 200 may be implemented as the firmware 104 in the computing device 100, for example. In an example embodiment, the firmware 200 may be implemented in an electrically erasable/programmable read-only memory (EEPROM). As shown in FIG. 2, the firmware 200 includes a write protected region 210 and a writeable region 220. In such an approach, the write protected region 210 may be written during manufacture of an associated computing device and then locked to protect the write protected region 210 from, for example, being inadvertently erased or subjected to corruption by a malicious act.

In the firmware 200, the write-protected region 210 may include a boot stub 212, which includes instructions for initiating a boot process for a computing device in which the firmware is implemented. As is discussed in further detail below, the boot stub 212 may include instructions that are used to determine whether execute a recovery mode procedure on an associated computing device. The boot stub 212 may also include a cryptographic key (e.g., a public key) that may be used to verify whether various portions of a computing device's image are in an unexpected state (e.g., corrupted, modified or missing).

The write-protected region 210 of the firmware 200 also includes recovery firmware 214 that may be used to initiate the recovery mode procedure for a computing device in which the firmware 200 is implemented. The writeable region 220 of the firmware 200 contains redundant computing device firmware portions, computing device firmware-A 222 and computing device firmware-B 224, which may include machine-readable instructions that implement a portion of a boot process for a computing device.

The redundant firmware portions 222 and 224 may allow a computing device, in which the firmware 200 is implemented, to successfully boot even if one of the firmware portions is in an unexpected state (e.g., has been subject to a malicious act or some other form of corruption). Also, including the firmware portions 222 and 224 in the writeable region 220 of the firmware 200 allows for the firmware to be "field updated" with updated firmware version that may include, for example, performance and/or security enhancements.

Including the boot stub 212 and the recovery firmware 214 in the write-protected region 210 of the firmware 200 provides security to a user or users of a computing device because the boot stub 212 and the recovery firmware 214 cannot be easily erased and re-written by an attacker with casual access to such a computing device. Such an approach reduces the risk that an attacker can persistently corrupt a computing device by modifying the boot stub 212 and/or the recovery firmware 214 such that execution of the recovery mode procedure is circumvented or executed in a manner that merely reinstalls malware on the computing device.

In some embodiments, such a computing device may be configured such that a change to the circuitry of the computing device would allow for erasing and rewriting the write-protected portion 210 of the firmware 200. For instance, manufacturers of computing devices may wish to make such a modification to enable efficient development of machine-readable instructions of the boot stub 212 and the recovery firmware 214, as well as any other machine-readable instructions or information (e.g., encryption keys) that may be stored in the write-protected portion 210 of the firmware 200.

In an example embodiment, the boot stub 212 may be used by a computing device (e.g., by a processor executing machine-readable instructions included in the boot stub 212) to detect whether the computing device may have been subjected to a malicious act or some other form of corruption. Such detection may include determining that the computing device has had its operating system removed, has had software (machine-readable instructions) installed that is not signed by a trusted supplier, has been subjected to some other type of malicious act intended to comprise the security of the computing device and/or personal information of a user or users of the computing device, or has experienced corruption in a current image as a result of some other incident (e.g., a power failure or an incomplete update of the image). If the instructions of the boot stub 212 detect that an attack or other corruption has occurred, the boot stub 212's instructions may then direct a processor to execute the recovery firmware 214 to initiate a recovery mode procedure to restore the computing device to a known, trusted state, such as in the manners described herein.

In an example embodiment, a boot sequence of a computing device such as the computing device 100 may be initiated by the processor 102 executing instructions included in the boot stub 212. In this situation, the machine-readable instructions of the boot stub 212 may direct the computing device 100 to boot by executing machine-readable instructions of the computing device firmware in either firmware-A 222 or firmware-B 224. If one of the firmware portions is corrupt, the other firmware portion may be used. The machine-readable instructions of the computing device firmware 222 or 224 may, in turn, direct the computing device 100 to load/verify/execute instructions of a kernel and an operating system included in the system memory 107, such as in a kernel partition or root filesystem, respectively.

Alternatively, if the instructions of the boot stub 212, when executed by the processor 102, determine that the recovery mode procedure is to be initiated (e.g., based on a recovery mode value/flag or by detecting an unexpected state in the computing device 100's current image), the machine-readable instructions of the boot stub 212 may direct the computing device 100 to execute machine-readable instructions of the recovery firmware 214. In this situation, the machine-readable instructions of the recovery firmware 214 may, in turn, direct the computing device 100 to execute machine-readable instructions of a recovery mode procedure (such as in a manner described herein), which may be stored, for example, at least in part, on the external storage device 120.

As illustrated in FIG. 2A, the firmware device 200 may also include a boot log portion 226 that is also included in the writeable region 220 of the firmware 200. In certain embodiments, a computing device may be configured to store information related to its boot process in the boot log 226. For instance, the computing device may keep a record of the date and time of each boot sequence of the computing in the boot log 226. The computing device may also record information regarding execution of a recovery mode procedure in the boot log 226. For example, the computing device may record the date and time to note each time the recovery firmware 214 is executed, along with an indication as to a reason that resulted in execution of the recovery firmware 214. The computing system may also record what actions were take during the recovery mode procedure, such as which parts of the computing device's image were repaired or replaced.

Figure 2B:
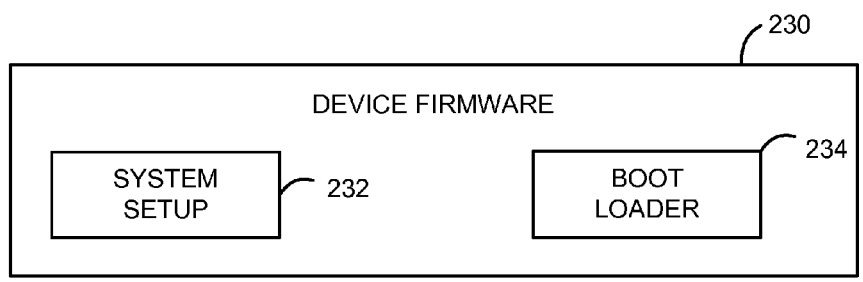

FIG. 2B is a block diagram illustrating a computing device firmware 230. The device firmware 230 may be used, for example, to implement the device firmware portions 222 and 224 of the firmware 200. As shown in FIG. 2B, the device firmware 230 includes a system setup portion 232 and a boot loader portion 234. In such an approach, the system setup portion 232 may be used to perform an initial setup of hardware components of a corresponding computing system. For instance, the system setup portion 232 may include instructions that initialize certain hardware components of the computing system (e.g., a chipset) to enable the boot loader portion 234 to load a kernel and an operating system of the computing device.

Figure 3:
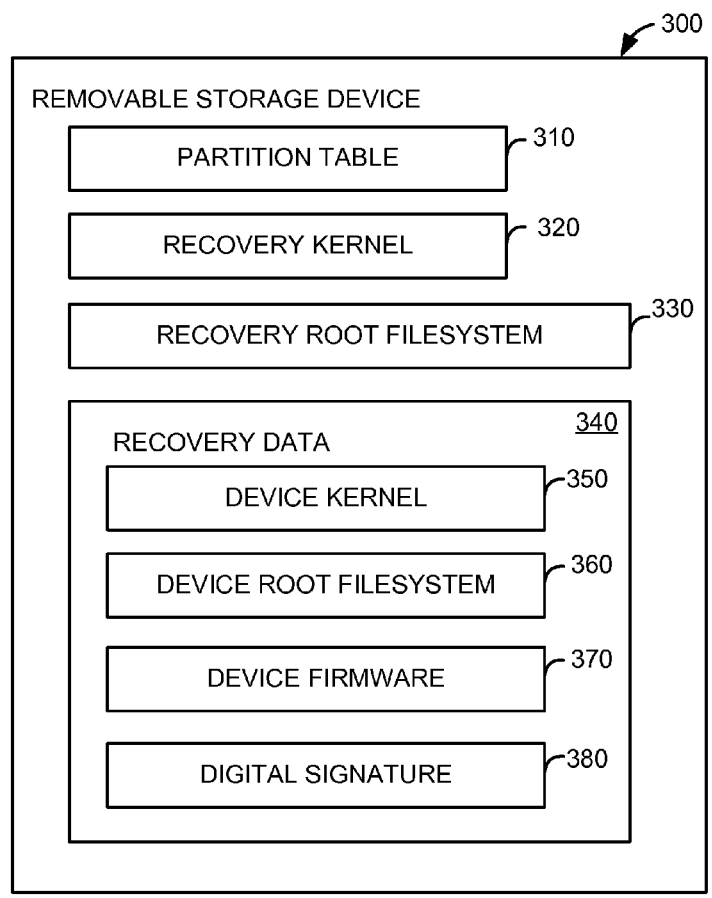
FIG. 3 is a block diagram illustrating a removable storage device containing a recovery image in accordance with an example embodiment.

FIG. 3 is a block diagram illustrating a removable recovery image storage device 300 containing a recovery image in accordance with an example embodiment. As shown in FIG. 3, the removable storage device 300 includes a partition table 310, a recovery kernel 320 and a recovery root filesystem 330 for use as an operating environment during execution of a recovery mode procedure. The recovery image storage device 300 also includes recovery data 340. The recovery data 340 includes a device kernel 350, a device root filesystem 360 and device firmware 370 for the computing device on which a recovery mode procedure is being executed. As shown in FIG. 3, the recovery data 340 also includes a digital signature 380 that may be used by a computing device to verify that the other portions of the recovery image stored on the storage device 300 are from a trusted/reliable source. For instance, a cryptographic key stored in a boot stub of the computing device may be used to verify the digital signature 380 based on a message digest (e.g., hash) of one or more portions of the recovery date 340.

If the computing device on which a recovery mode procedure is being executed verifies that the recovery image containing the recovery data 340 is from a trustworthy source (e.g., the digital signature 380 matches the message digest), the computing device may then continue to execute a corresponding recovery mode procedure using the recovery data 340 to repair or replace a current image of the computing device.

Figure 4:
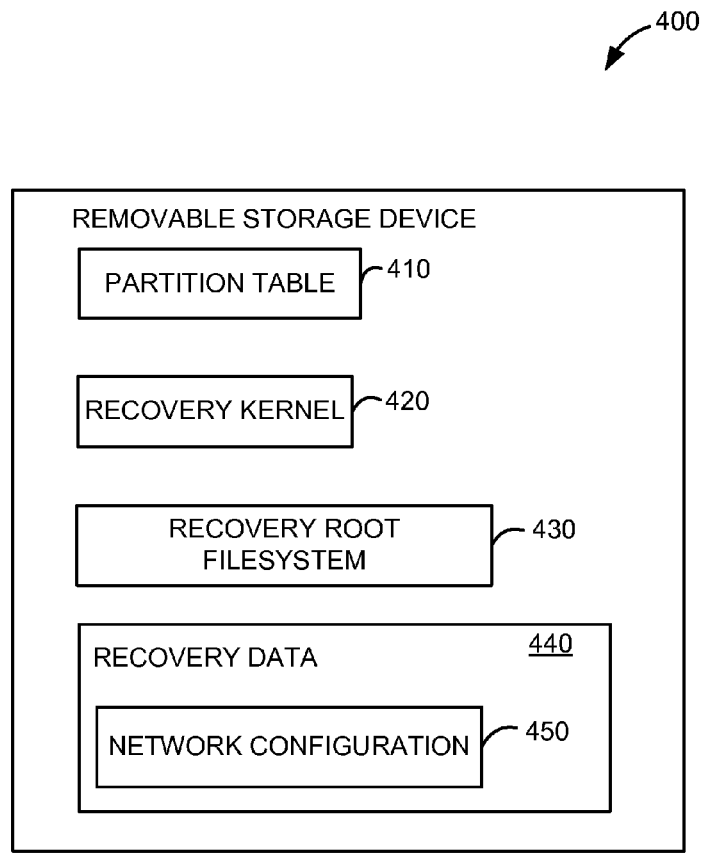
FIG. 4 is a block diagram illustrating a removable storage device containing another recovery image in accordance with an example embodiment.

FIG. 4 is a block diagram illustrating a removable storage device 400 containing another recovery image in accordance with an example embodiment. As shown in FIG. 4, the removable storage device 400 includes a partition table 410, a recovery kernel 420 and a recovery root filesystem 430 for use as an operating environment during execution of a recovery mode procedure, such as in similar fashion as the recovery image illustrated in FIG. 3.

The recovery device 400 also includes recovery data 440. The recovery data 440 of the storage device 400 includes a network configuration 450. In such an approach, the network configuration 450 may be used by a computing device to initialize a network interface and use the network interface to obtain a device kernel, a device root filesystem, device firmware and a digital signature, which may then be used during a recovery mode procedure in similar fashion as the device kernel 350, the device root filesystem 360, the device firmware 370 and the digital signature 380 of FIG. 3. In an example approach, the recovery data 440 may also include another digital signature that is based on the network configuration information 450. In such an arrangement, the network configuration digital signature may be used to verify that the network configuration 450 of the recovery image illustrated in FIG. 4 is from a trustworthy source, such as a supplier of the computing system on which the corresponding recovery mode procedure is being executed. It will be appreciated that the removable storage devices 300 and 400 could be used, for example, to implement the removable storage device 120 shown in FIG. 1 when executing a recovery mode procedure for the computing device 100.

Figure 5:
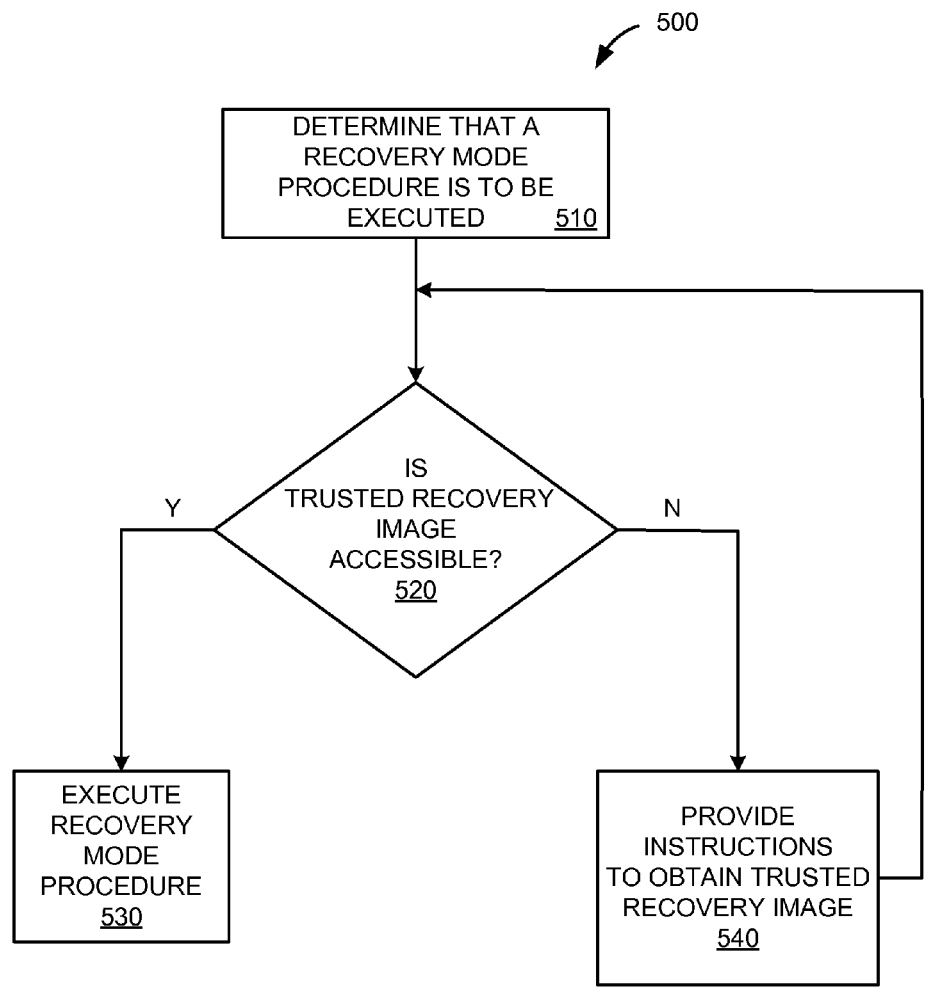
FIG. 5 is a flowchart illustrating a method for implementing a recovery mode procedure in accordance with an example embodiment.

FIG. 5 is a flowchart illustrating a method 500 for implementing a recovery mode procedure in accordance with an example embodiment. The method 500 may be implemented, for example, using the apparatus described above with respect to FIGS. 1-4 and the apparatus illustrated in FIG. 10, in appropriate combinations. Also, the method 500 may be implemented in conjunction with one or more of the methods illustrated in FIGS. 6-9, which are discussed in further detail below.

The method 500 includes, at block 510, determining that a recovery mode procedure is to be executed on a computing device. This determination may be made in a number of fashions, such as using the techniques described herein. At block 520, the method 500 further includes determining whether a trusted recovery image is accessible to the computing device. The determination at block 520 may also be made in a number of fashions, such as using the techniques described herein, for example. For instance, determining whether a trusted recovery image is accessible to the computing device may include examining the contents of a removable storage device that is operationally coupled with the computing device to determine whether a recovery image is present. In the event a recovery image is present on the removable storage device, the determination at block 520 may also include determining whether the recovery image on the removable storage device is a trusted recovery image by verifying a digital signature of the recovery image using a public encryption key stored in the computing system, such as stored in a boot stub, for example.

If it is determined at block 520 that a trusted (verified) recovery image is accessible to the computing device, such as on a removable storage device, the method 500 may proceed to block 530. At block 530, the method 500 includes executing a recovery mode procedure using the trusted recovery image to repair or replace a current image of the computing device. A removable storage device that includes the trusted recovery image may be prepared prior to the recovery mode procedure being executed. For example, a removable storage device with a trusted recovery image may be provided to a consumer when purchasing a corresponding computing device. In other instance, a user may prepare recovery device and carry it with him or her in the event the user has reason to execute a recovery mode procedure on his or her computing device.

If, however, it is determined at block 520 that a trusted recovery image is not accessible to the computing device (e.g., there is no removable storage device present; there is no recovery image stored on the removable storage device, or a recovery image stored on the removable storage device fails digital signature verification), the method 500 may proceed to block 540. At block 540, the computing system may provide instructions to a user on how to obtain a recovery image. For instance, the computing device may display instructions on an associated display device that instruct a user how to obtain a trusted recovery image and store the trusted recovery image on a removable storage device. In an example approach, the user may be instructed to access, using a second computer, a specific website and enter identifying information for their computing device, such as a serial number or model number. The website may then provide the trusted recovery image to the second computing device for storage on a removable storage device. The second computing device may have a similar configuration as the computing device 100, or may have a different configuration.

Once the trusted recovery image is stored on the removable storage device, the removable storage device may be operationally coupled with the computing system on which the recovery mode procedure is being executed. The method 500 may then return to block 520, where the computing device would verify that the obtained trusted recovery image is accessible to the computing device (e.g., including digital signature verification) and the recovery mode procedure to repair or replace a current image of the computing device using the obtained trusted recovery image may be executed at block 530.

Figure 6:
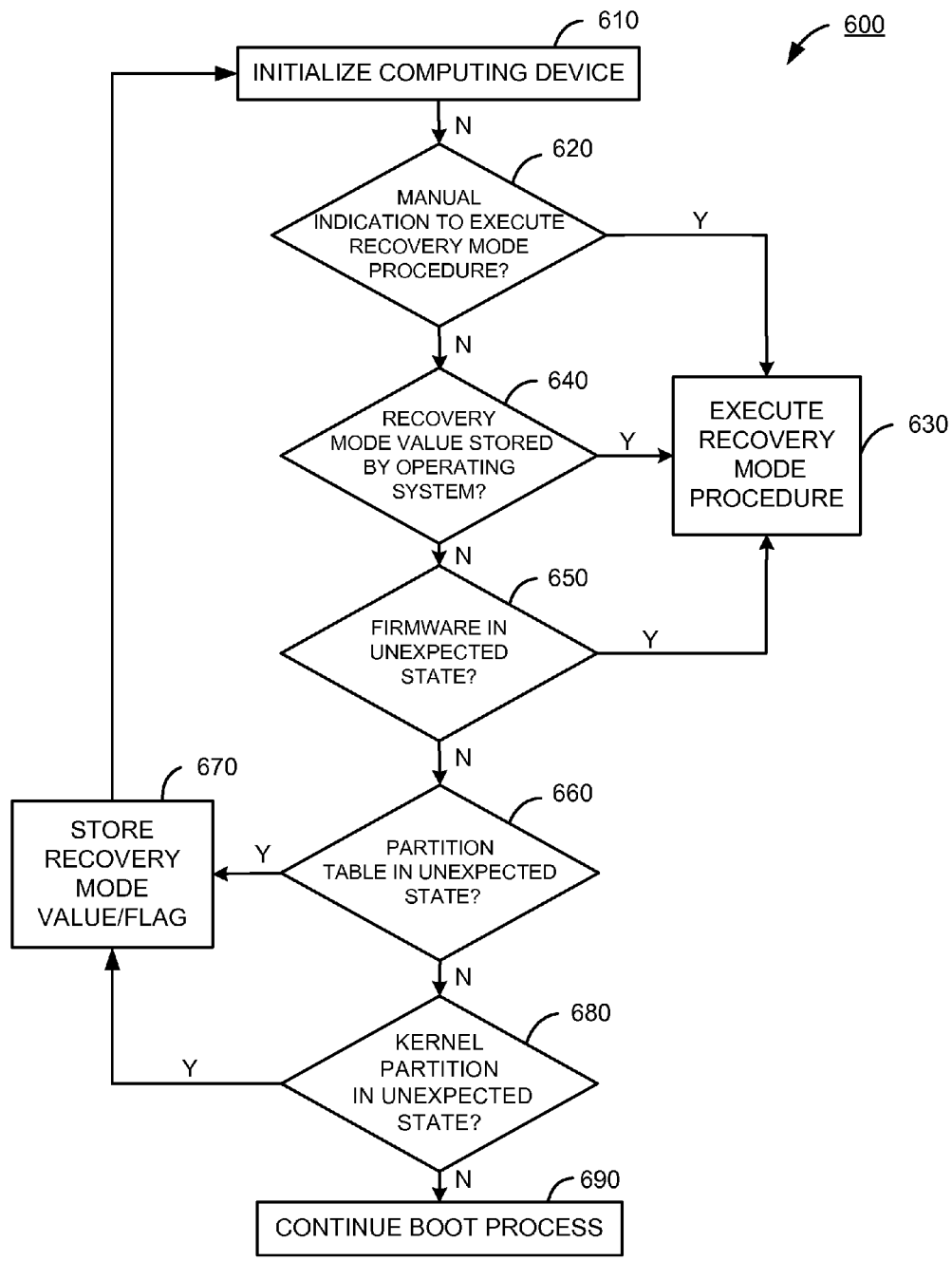
FIG. 6 is a flowchart illustrating operations of a recovery mode procedure in accordance with an example embodiment.

FIG. 6 is a flowchart illustrating a method 600 that includes operations for determining that a recovery mode procedure is to be run on a computing device. In an example embodiment, the operations illustrated in FIG. 6 may be executed, at least in part, by instructions of a boot stub portion of firmware of a computing device, such as the boot stub 212 shown in FIG. 2 and discussed above. Also, the operations of the method 600 (and other methods discussed herein) may be performed in a number of appropriate orders and in conjunction with one or more other methods. In some embodiments, additional operations may be performed, while in other embodiments, one or more operations may be eliminated. Further, the result of the decision block in the method 600 may vary depending on the particular embodiment. For instance, in certain situations, a computing device may proceed directly to execution of a recovery mode procedure rather than storing a recovery mode value/flag to indicate that the recovery mode procedure should be executed on a next boot cycle. In other instances, a computing device may store a recovery mode value/flag instead of proceeding directly to execution of a recovery mode procedure.

The method 600 includes, at block 610, initializing a computing device. For instance, at block 610, a limited amount of system resources may be initialized so that the system is capable of executing instructions stored in, e.g., a boot stub, to implement the remaining operations of the method 600. In an example system, the processor, Random Access Memory (RAM) and any interfaces needed to communicate between the processor, firmware and RAM may be initialized.

At block 620, the method 600 includes determining whether a manual indication to execute a recovery mode procedure has been generated. Such a manual indication may be generated, for example, using the manual mode recovery indication device 110 shown in FIG. 1 and described above. For instance, the manual indication may be generated as a result of a user engaging a recovery mode button included on a computing system. If the manual indication has been received at block 620, the method 600 may proceed to block 630 and a recovery mode procedure may be executed, such as using the approaches discussed herein. If the manual indication is not detected at block 620, the method 600 may proceed to block 640.

At block 640, the method 600 includes determining whether a recovery mode value/flag was previously stored in the computing such, such as stored in system memory by an operating system of a computing device. As previously described, the recovery mode value may also indicate a reason as to why execution of the recovery mode procedure has been requested. For instance the recovery mode value/flag may indicate that the operating system of the computing device detected that a kernel partition and/or a root filesystem is in an unexpected state. If it is determined, at block 640 that a recovery mode procedure it to be executed, the method 600 may proceed to block 630 and the recovery mode procedure may be executed, such as using the approaches discussed herein. If it is determined, at block 640 that the recovery mode value/flag has not been set to indicate that the recovery mode procedure is to be executed, the method 600 may move to block 650.

At block 650, the method 600 includes determining whether firmware of a computing system is in an unexpected state. For instance, firmware (e.g., a volatile portion of the firmware in a non-write-protected portion of a firmware device) may not have been previously loaded onto the computing system. In other situations the firmware (one or more copies) may be corrupted and, therefore, fail corresponding digital signature verification operations. If it is determined, at block 650, that the firmware of the computing system is in an unexpected state, the method 600 may move to block 630 and the recovery mode procedure may be executed, such as using the approaches discussed herein. If it is determined, at block 650 that the firmware successfully verifies and is in its expected state, the method 600 may move to block 660.

At block 660, the method 600 includes determining whether a partition table of the computing device is in an unexpected state, such as using a number of appropriate techniques. If it is determined, at block 660, that the partition table of the computing system is in an unexpected state, the method 600 may move to block 670 and a recovery mode value/flag may be stored so that the recovery mode procedure will be executed on a next boot cycle of the computing device. After storing the recovery mode value/flag at block 670, the method 600 may return to block 610 to begin a new boot cycle, during which the recovery mode procedure may be executed at block 630 via block 640. If it is determined, at block 660 that the partition table is in its expected state, the method 600 may move to block 680.

At block 680, the method 600 includes determining whether a kernel partition (e.g., one or more copies of the kernel partition) of the computing device is in an unexpected state, such as using a number of appropriate techniques. If it is determined, at block 680, that the kernel partition of the computing system is in an unexpected state, the method 600 may move to block 670 and a recovery mode value/flag may be stored so that the recovery mode procedure will be executed on a next boot cycle of the computing device. After storing the recovery mode value/flag at block 670, the method 600 may return to block 610 to begin a new boot cycle, during which the recovery mode procedure may be executed at block 630 via block 640. If it is determined, at block 680 that the kernel partition is in its expected state, the method 600 may move to block 690 and the boot process of the computing device may be continued.

Figure 7:
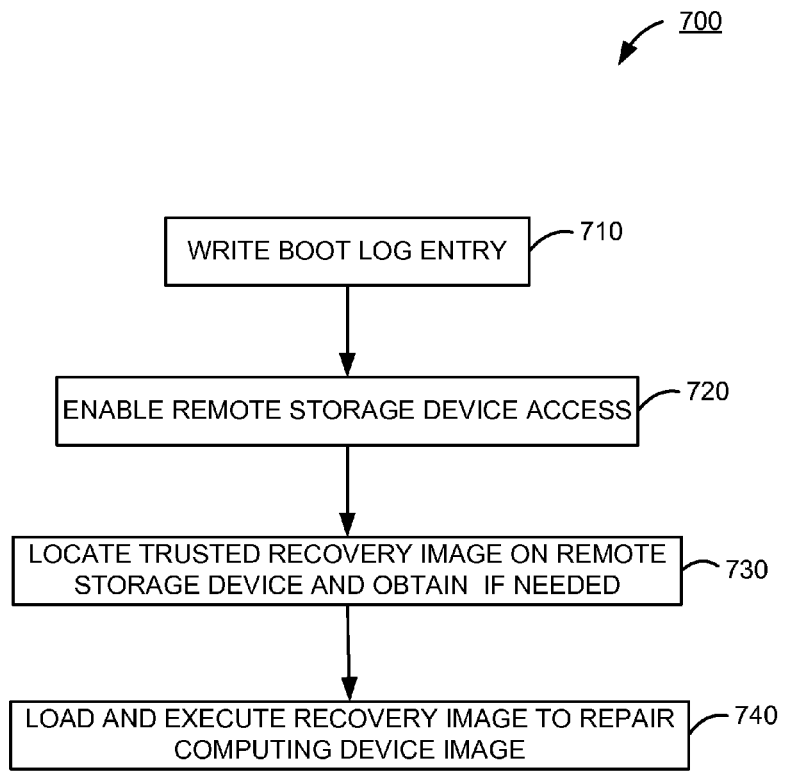
FIG. 7 is a flowchart illustrating operations of a recovery mode procedure in accordance with an example embodiment.

FIG. 7 is a flowchart illustrating a method 700 that includes operations of a recovery mode procedure in accordance with an example embodiment. In an example embodiment, the operations illustrated in FIG. 7 may be executed, at least in part, by instructions of recovery firmware of a computing device, such as the recovery firmware 214 shown in FIG. 2 and discussed above. Also, in like fashion as the method 600, the operations of the method 700 (and other methods discussed herein) may be performed in a number of appropriate orders and in conjunction with one or more other methods. In certain embodiments, additional operations may be performed, while in other embodiments, one or more operations may be eliminated. For instance, a computing device may implement firmware that does not include a boot log portion. In such a computing device, the operations of the method 700 related to the boot log may be eliminated.

The method 700 as shown in FIG. 7 includes, at block 710, writing a boot log entry in a boot log, such as the boot log 226 illustrated in FIG. 2. The boot log entry of block 710 may indicate why the recovery mode procedure is being executed, as well as other information related to execution of the recovery mode procedure, such as, for example, a timestamp corresponding with the start of execution of the procedure.

At block 720, the method 700 includes initializing or enabling components of the computing system that will allow the computing device to execute the recovery process. For example, the operations at block 720 may include initializing an external storage device interface (e.g., a USB data port or a SD card reader), such as the external storage device interface 114 illustrated in FIG. 1 and described above. Enabling the external storage device interface allows the computing device to access a recovery image that is stored on a removable storage device that is coupled with the external storage device interface in order to execute the recovery mode procedure.

At block 730, the method 700 includes determining (e.g., by examining contents of a removable storage device on which a recovery image may be stored) whether a trusted recovery image is accessible to the computing device and obtaining the trusted recovery image if needed, including verifying, e.g., using digital signatures, that the recovery image is from a trustworthy source. A trusted recovery image may be obtained in a number of fashions, such as using the approaches described herein. For instance, a trusted recovery image may be obtained using the method 800 illustrated in FIG. 8A.

Once a trusted recovery image is accessible to the computing device (e.g., on a removable storage device and/or via a network interface), the method 700 may proceed to block 740. At block 740, the method 700 includes loading and executing the trusted recovery image to repair (or replace) a current image of the computing device. An example approach for repairing/replacing a computing device image using a trusted recovery image is illustrated in FIG. 9A.

Figure 8A:
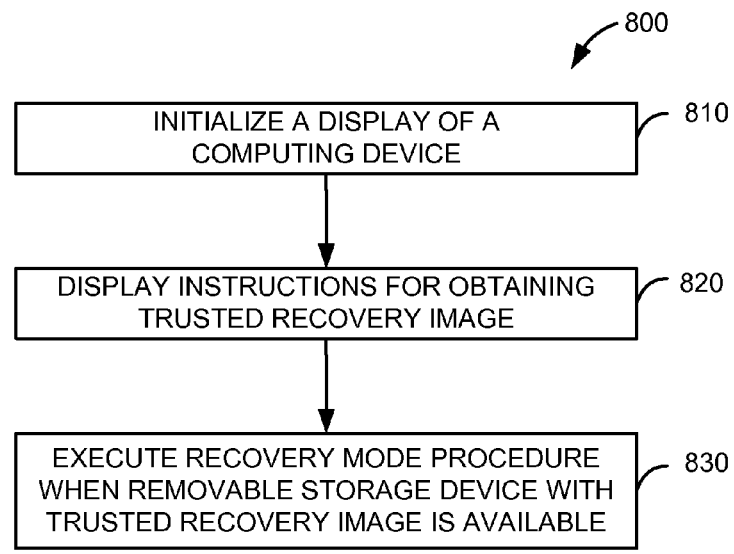
FIG. 8A is a flowchart illustrating a method for obtaining a trusted recovery image in accordance with an example embodiment.

FIG. 8A is a flowchart illustrating a method 800 that includes operations of a recovery mode procedure in accordance with an example embodiment. In certain embodiments, the operations illustrated in FIG. 8 may be executed, at least in part, by instructions of recovery firmware of a computing device, such as the recovery firmware 214 shown in FIG. 2 and discussed above. Also, in like fashion as the methods 600 and 700, the operations of the method 800 (and other methods discussed herein) may be performed in a number of appropriate orders and in conjunction with one or more other methods. In certain embodiments, additional operations may be performed, while in other embodiments, one or more operations may be eliminated.

The method 800 includes, at block 810, initializing a display of a computing device in order to display information related to a recovery mode process on a user display of the computing device. At block 820, the method 800 includes displaying instructions for obtaining a trusted recovery image. For instance, the instructions of the block 820 may include instructions that direct a user to navigate to a specific website, e.g., using a second computer, and then enter, at that website, identifying information for the computing device on which a recovery mode procedure is being run. The instructions may further describe how to obtain and store a trusted recovery image on a removable storage device and how to insert the removable storage device with the trusted recovery image into the computing device that is executing the recovery mode procedure. In certain embodiments, the instructions of block 820 may also inform the user as to the types of removable storage devices that are compatible with his or her computing device.

Once the removable storage device with the trusted recovery image is inserted in (coupled with) the computing device running the recovery mode procedure, the method 800 may proceed to block 830. At block 830, the computing device may load/execute the trusted recovery image from the removable storage device and use the trusted recovery image to repair or replace a current operating image of the computing device.

FIG. 8B is a diagram of a computing device 840. The computing device 840 may be used when implementing the method 800. As shown in FIG. 8B, the computing device 840 includes user instructions 850 related to implementing a recovery procedure on the computing device 840. The instructions 850 may include instructions for obtaining a trusted recovery image, such as those described above with respect to block 820 of the method 800.

FIG. 9A is a flowchart illustrating a method 900 that includes operations of a recovery mode procedure in accordance with an example embodiment. In an example embodiment, the operations illustrated in FIG. 9A may be executed, at least in part, by instructions included in a trusted recovery image, such as the trusted recovery images described herein, e.g., with respect to FIGS. 3 and 4. Also, in like fashion as the methods 600, 700 and 800, the operations of the method 900 (and other methods discussed herein) may be performed in a number of appropriate orders and in conjunction with one or more other methods. In certain embodiments, additional operations may be performed, while in other embodiments, one or more operations may be eliminated. For instance, a computing device may implement firmware that does not include a boot log portion. In such a computing device, the operations of the method 900 related to the boot log may be eliminated.

At block 905, the method 900 includes initializing a display device of a computing system and displaying a notice that recovery of the computing system's operating image is in process. Such a message may provide a user with assurance that recovery of the operating image is being done to replace a damaged or compromised image with a trusted, safe image. Such assurances may prevent a user from panicking and interrupting the recovery mode procedure, which could cause further corruption to the computing device. If the method 900 is implemented in conjunction with the method 800, the operations performed at block 905 may eliminate initializing the display device, as the display device would have already been initialized at block 810 of the method 800. In this situation, the operation at block 905 may merely include displaying the recovery mode notice.

At block 910, the method 900 may include running one or more functionality tests on hardware components of the computing device that is executing the recovery mode procedure. Such tests may determine that a hardware failure is the reason the recovery mode procedure is being executed. In this situation, repairing or replacing an operating image of the computing device would be very unlikely to correct the hardware failure. Therefore, if a hardware failure occurs at block 910, the method operations at block 910 may also include providing instructions (e.g., using a display device) concerning how a user can address the hardware failure, such as warranty information and/or return instructions, for example.

If the hardware tests pass at block 910, the method 900 may proceed to block 915. At block 915, the method 900 includes verifying whether one or more copies of firmware of the computing device are in an expected state. This verification (and the verifications for the other operations of the method 900) may be done using digital signatures and cryptographic keys, such as in the fashions described herein. If any of the firmware copies do not verify, the method 900 includes replacing those firmware copies with device firmware included in a trusted recovery image, whether stored on a removable storage device or obtained over a network interface, such as in the manners described herein.

At block 920, the method 900 includes verifying whether one or more kernel partitions are in an expected state. If any of the kernel partitions do not verify, the method 900 includes replacing those kernel partitions with a device kernel partition included in a trusted recovery image, whether stored on a removable storage device or obtained over a network interface, such as in the manners described herein.

At block 925, the method 900 includes verifying whether one or more root filesystem copies are in an expected state. If any of the root filesystem copies do not verify, the method 900 includes replacing those root filesystem copies with a device root filesystem included in a trusted recovery image, whether stored on a removable storage device or obtained over a network interface, such as in the manners described herein.

At block 930, the method 900 includes deleting user data from the computing device. For computers that are used in cloud-based computing environments, removal of user data is unlikely to result in any inconvenience to the user, as important user data would be maintained in a "network cloud." However, in some embodiments, prior to deleting the user data, the computing system may provide the user with the option to confirm or cancel deletion of his or her user data. However, if the user data is a source of corruption for an image of the computing system, not deleting the user data could result in the computing system becoming corrupted again by the same user data.

At block 935, if a user manually initiated execution of the recovery mode procedure, a query may be presented to the user (e.g., using a display device) as to a reason why he or she triggered execution of the recovery mode procedure. Such a query may present the user with a list of choices and/or allow the user to enter a narrative reason. The reason provided by the user could then be provided to a manufacturer of the computing device. The manufacturer could then use such data collected from a user population to improve computing system performance and security.

At block 940, the method 900 includes writing an entry in a boot log of the computing device, such as a boot log maintained in firmware of the device. The boot log entry of block 940 may indicate each of the actions taken during the recovery mode procedure, such as which portions of the computing device's image were repaired or replaced, for example.

FIG. 9B is a diagram of a computing device 945. The computing device 945 may be used when implementing the method 900. As shown in FIG. 9B, the computing device 945 includes a recovery mode notice 950, such as the recovery mode notice discussed above with respect to block 905 of the method 900.

Figure 10:
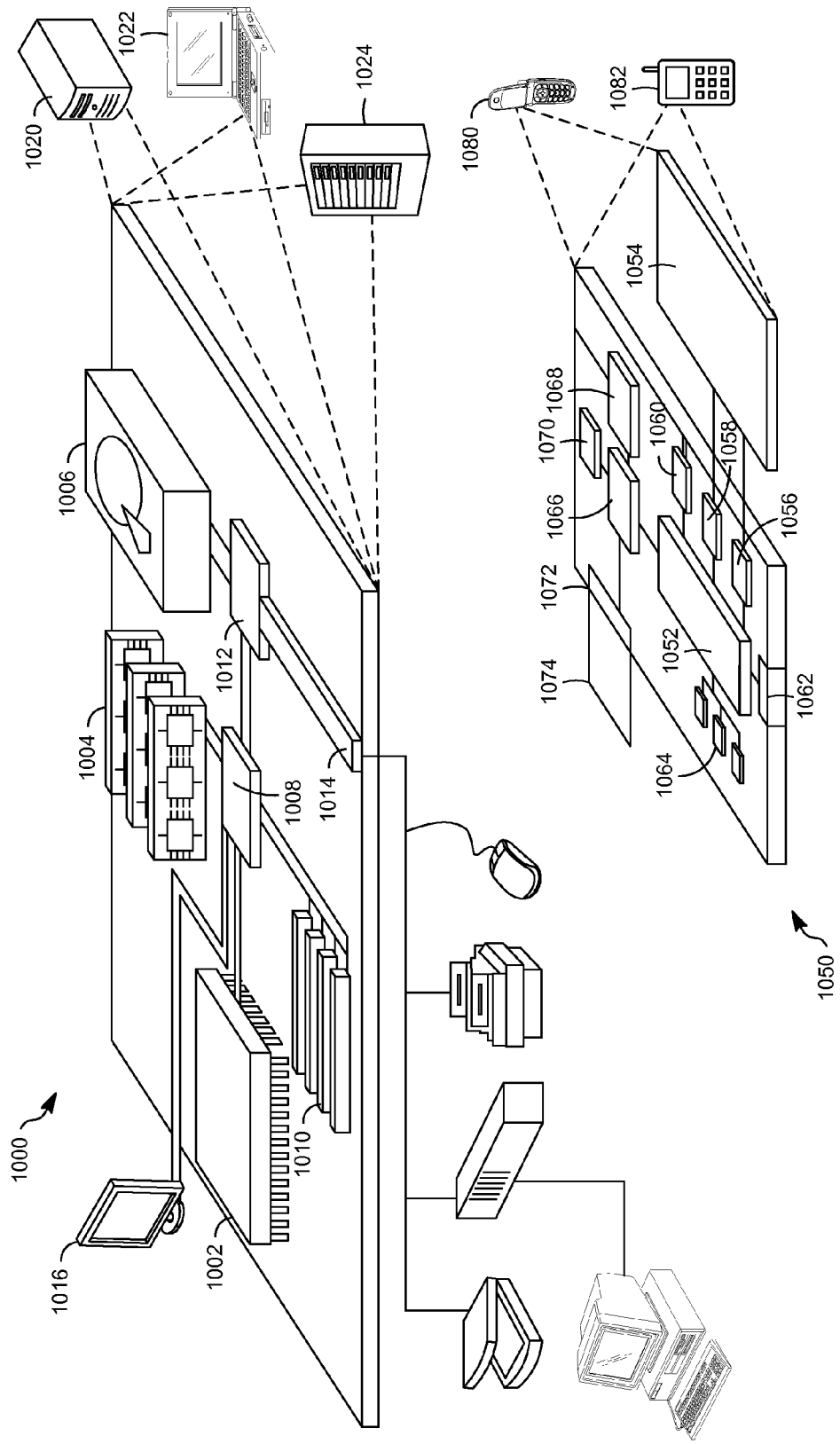
FIG. 10 is a block diagram illustrating a computer device and a mobile computer device that can be used to implement the techniques described herein in accordance with an example embodiment.

FIG. 10 is a diagram that shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, which may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (computing device) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
   a processor; and
   at least one memory device operationally coupled with the processor, wherein the at least one memory device has instructions stored thereon that, when executed by the processor, cause the computing device to:
      receive a first indication, the first indication indicating that instructions for implementing a recovery mode of the computing device are to be executed;
      in response to receiving the first indication, executing the instructions to implement the recovery mode, wherein implementing the recovery mode includes:
         receiving, from a user of the computing device, a second indication; and
         based on receipt of the second indication, performing one of:
            a first process that includes replacing current operating system software of the computing device with a trusted version of operating system software of the computing device and removing user data from the computing device; or
            a second process that includes replacing the current operating system software of the computing device with the trusted version of operating system software of the computing device and retaining user data on the computing device.

2. The computing device of claim 1, wherein replacing the current operating system software of the computing device with the trusted version of operating system software of the computing device comprises restoring the operating system software of the computing device to an original state.

3. The computing device of claim 1, wherein the first indication is received in response to a user's selection of a manual recovery mode indication device.

4. The computing device of claim 3, wherein the manual recovery mode indication device comprises a recovery mode button of the computing device.

5. The computing device of claim 1, wherein the trusted version of operating system software comprises digitally signed operating system software.

6. The computing device of claim 1, wherein the second indication is received in response to a user's interaction with a graphical recovery mode interface that is displayed on a display device of the computing device in response to receiving the first indication.

7. The computing device of claim 1, wherein implementing the recovery mode further includes retaining one or more configuration settings of the computing device.

8. The computing device of claim 7, wherein the one or more configuration settings include network settings of the computing device.

9. The computing device of claim 1, wherein the instructions to implement the recovery mode are included on a recovery mode data-storage device, the recovery mode data-storage device comprising a removable, external data-storage device that is operably coupled with the computing device.

10. The computing device of claim 9, wherein the removable, external data-storage device comprises one of a universal serial bus storage device or a secure digital card storage device.

11. The computing device of claim 9, wherein the instructions stored on the at least one memory device further comprise instructions that, when executed by the processor, further cause the computing device to write the instructions to implement the recovery mode to the recovery mode device.

12. A computer-implemented method including:
   receiving, by a processor of a computing device, a first indication, the first indication indicating that a recovery mode procedure of the computing device is to be performed;
   in response to receiving the first indication, executing instructions to implement the recovery mode, wherein performing the recovery mode procedure includes:
      receiving, from a user of the computing device, a second indication; and
      based on receipt of the second indication, performing one of:
         a first process that includes replacing current operating system software of the computing device with a trusted version of operating system software of the computing device and removing user data from the computing device; or
         a second process that includes replacing the current operating system software of the computing device with the trusted version of operating system software of the computing device and retaining user data on the computing device.

13. The computer-implemented method of claim 12, wherein replacing the current operating system software of the computing device with the trusted version of the operating system software of the computing device comprises restoring the operating system software of the computing device to an original state.

14. The computer-implemented method of claim 12, wherein receiving the first indication comprises receiving a signal from a manual indication device.

15. The computer-implemented method of claim 12, wherein receiving the second indication comprises receiving a user selection via a graphical recovery mode interface that is displayed by the computing device in response to receiving the first indication.

16. The computer-implemented method of claim 12, wherein performing the recovery mode procedure further includes retaining one or more configuration settings of the computing device.

17. The computer-implemented method of claim 12, further comprising, prior to receiving the first indication, generating a recovery mode device, the recovery mode device comprising a removable, external data-storage device having instructions for implementing the recovery mode stored thereon.

18. A computing device comprising:
a display device;
a processor; and
at least one memory device operationally coupled with the processor, wherein the at least one memory device has instructions stored thereon that, when executed by the processor, cause the computing device to:
receive a first indication, the first indication indicating that instructions for implementing a recovery mode of the computing device are to be executed;
in response to receiving the first indication, executing the instructions to implement the recovery mode, wherein implementing the recovery mode includes:
providing, on the display device, a graphical recovery mode interface that includes information related to the recovery mode;
in response to providing the graphical recovery mode interface, receiving, from a user of the computing device, a second indication; and
based on receipt of the second indication, performing a process that includes replacing current operating system software of the computing device with a trusted version of operating system software of the computing device and removing user data from the computing device.

19. The computing device of claim 18, wherein replacing the current operating system software of the computing device with the trusted version of operating system software of the computing device comprises restoring the operating system software of the computing device to an original state.

20. The computing device of claim 18, wherein the first indication is received in response to a user's selection of a manual recovery mode indication device.

21. The computing device of claim 18, wherein the instructions to implement the recovery mode are included on a recovery mode data-storage device, the recovery mode data-storage device comprising a removable, external data-storage device that is operably coupled with the computing device.

22. The computing device of claim 21, wherein the instructions stored on the at least one memory device further comprise instructions that, when executed by the processor, further cause the computing device to write the instructions to implement the recovery mode to the recovery mode device.

23. The computing device of claim 18, wherein the trusted version of operating system software comprises digitally signed operating system software.

24. A computing device comprising:
a display device;
a processor; and
at least one memory device operationally coupled with the processor, wherein the at least one memory device has instructions stored thereon that, when executed by the processor, cause the computing device to:
receive a first indication, the first indication indicating that instructions for implementing a recovery mode of the computing device are to be executed;
in response to receiving the first indication, executing the instructions to implement the recovery mode, wherein implementing the recovery mode includes:
providing, on the display device, a graphical recovery mode interface that includes information related to the recovery mode;
in response to providing the graphical recovery mode interface, receiving, from a user of the computing device, a second indication; and
based on receipt of the second indication, performing a process that includes replacing current operating system software of the computing device with a trusted version of operating system software of the computing device and retaining user data on the computing device.

25. The computing device of claim 24, wherein replacing current operating system software of the computing device comprises restoring the operating system software of the computing device to an original state.

26. The computing device of claim 24, wherein the first indication is received in response to a user's selection of a manual recovery mode indication device.

27. The computing device of claim 24, wherein implementing the recovery mode further includes retaining one or more configuration settings of the computing device.

28. The computing device of claim 24, wherein the instructions to implement the recovery mode are included on a recovery mode data-storage device, the recovery mode data-storage device comprising a removable, external data-storage device that is operably coupled with the computing device.

29. The computing device of claim 24, wherein the trusted version of operating system software comprises digitally signed operating system software.

* * * * *